United States Patent
Freissmann et al.

(10) Patent No.: US 7,346,830 B2
(45) Date of Patent: Mar. 18, 2008

(54) USAGE OF AN SDRAM AS STORAGE FOR CORRECTION AND TRACK BUFFERING IN FRONTEND ICS OF OPTICAL RECORDING OR REPRODUCTION DEVICES

(75) Inventors: Lothar Freissmann, Niedereschach (DE); Marten Kabutz, Villingen-Schwenningen (DE); Richard Rutschmann, Wutöschingen (DE)

(73) Assignee: Thomson Licensing, Boulogne (FR)

( * ) Notice: Subject to any disclaimer, the term of this patent is extended or adjusted under 35 U.S.C. 154(b) by 1198 days.

(21) Appl. No.: 10/168,161

(22) PCT Filed: Dec. 12, 2000

(86) PCT No.: PCT/EP00/12551

§ 371 (c)(1),
(2), (4) Date: Jun. 17, 2002

(87) PCT Pub. No.: WO01/45101

PCT Pub. Date: Jun. 21, 2001

(65) Prior Publication Data

US 2002/0191967 A1    Dec. 19, 2002

(30) Foreign Application Priority Data

Dec. 17, 1999   (EP) .................................. 99125206

(51) Int. Cl.
*G11C 29/00* (2006.01)
(52) U.S. Cl. .................. 714/763; 714/784; 714/775
(58) Field of Classification Search ................ 714/763, 714/762, 784, 770, 773, 25, 742, 775, 769
See application file for complete search history.

(56) References Cited

U.S. PATENT DOCUMENTS

| | | | | |
|---|---|---|---|---|
| 5,896,346 A | * | 4/1999 | Dell et al. ................... | 365/233 |
| 5,974,514 A | * | 10/1999 | Andrewartha et al. ...... | 711/166 |
| 6,223,322 B1 | * | 4/2001 | Michigami et al. ......... | 714/769 |
| 6,272,153 B1 | * | 8/2001 | Huang et al. ............... | 370/503 |
| 6,278,645 B1 | * | 8/2001 | Buckelew et al. ..... | 365/230.01 |

(Continued)

FOREIGN PATENT DOCUMENTS

EP    917 143 A1    5/1999

(Continued)

OTHER PUBLICATIONS

H-C. Chang and C. Shung, "*A Reed-Solomon Product-Code (RS-PC) Decoder for DVD Applications*", IEEE International Solid State Circuits Conference, US, IEEE Inc., Feb. 1998, XP000862225, New York, pp. 391, 392 & 470.

(Continued)

*Primary Examiner*—Guy Lamarre
*Assistant Examiner*—Fritz Alphonse
(74) *Attorney, Agent, or Firm*—Joseph J. Laks; Robert B. Levy

(57) ABSTRACT

A method and arrangement for using Synchronous Dynamic Random Access Memory (SDRAM) as storage for correction and track buffering in front end ICs of optical recording or reproduction devices. Data to be stored or read is organized in appropriate bursts for accelerating the SDRAM (SDR) traffic. The SDRAM is built around two banks of memory, and are accessed using a pipelined address logic, thereby accelerating access speeds.

8 Claims, 3 Drawing Sheets

U.S. PATENT DOCUMENTS

| | | | |
|---|---|---|---|
| 6,330,626 B1* | 12/2001 | Dennin et al. | 710/52 |
| 6,370,658 B2* | 4/2002 | Jeong | 714/25 |
| 6,587,896 B1* | 7/2003 | Baldwin et al. | 710/13 |
| 6,754,858 B2* | 6/2004 | Borkenhagen et al. | 714/720 |
| 6,868,519 B2* | 3/2005 | Beacken et al. | 714/762 |

FOREIGN PATENT DOCUMENTS

| | | |
|---|---|---|
| GB | 2 276 255 | 9/1994 |
| GB | 2 321 334 | 7/1998 |
| WO | 99/57724 | 11/1999 |

OTHER PUBLICATIONS

Hideki Yamauchi et al., "*A 24X-Speed Circ Decoder for a CD-DSP/CD-ROM Decoder LSI*", IEEE Transactions on Consumer Electronics, vol. 43, No. 3, Aug. 1997, XP000742521, pp. 483-489.
Search Report.

* cited by examiner

USAGE OF AN SDRAM AS STORAGE FOR CORRECTION AND TRACK BUFFERING IN FRONTEND ICS OF OPTICAL RECORDING OR REPRODUCTION DEVICES

This application claims the benefit under 35 U.S.C. §365 of International Application PCT/EP00/12551, filed Dec. 12, 2000, which claims the benefit of European Application No. 99125206.5, filed Dec. 17, 1999.

FIELD OF THE INVENTION

The present invention relates to a method and an arrangement for the usage of an SDRAM as storage for correction and track buffering in frontend ICs of optical recording or reproduction devices, and more particularly to a method and an arrangement for the usage of an SDRAM as storage for correction and track buffering in DVD frontend ICs which also can be used for CD applications.

BACKGROUND OF THE INVENTION

A conventional optical recording or reproduction device comprises an SRAM or a DRAM storage for correction and track buffering in frontend ICs of optical recording or reproduction devices.

The SDRAM is built around two banks of memory, which are accessed by particular pipelined address logic. In contrast to the normal DRAMS addressing can be done in parallel to the data operation and depending on the mode chosen a burst of consecutive locations is operated. This accelerates the speed compared to the common DRAM drastically, on the other hand needs some additional buffering and address control.

SDRAM is an acronym for Synchronous DRAM that means a DRAM technology that uses a clock to synchronize signal input and output on a memory chip. The clock is generated in the driving IC and derived from it's system clock so that the timing of the memory chips and the timing of the driving IC are in synchronization. The data streams for storing, correction and track buffering in frontend ICs of optical recording or reproduction devices are due to several different modes, asynchronous data streams and are not designed in a way that it can be handled directly within an SDRAM because it has no defined burst structure as well as a constant speed as it is commonly used in computer applications. An adaptation of the streams for SDRAM usage is therefore necessary.

A system decoder for high-speed data transmission with track buffer for an optical disc player has been disclosed by GB-A-2 321 334. Said system decoder includes a track buffer memory, a first FIFO memory for receiving data descrambled and error-detected and outputting the data by a unit of plural words, a second FIFO memory for receiving data from the track buffer memory and outputting the data by the unit of plural words, and a track buffer controller writing data in the first FIFO memory into the track buffer memory in a page mode, and reading the data written in the track buffer memory in a page mode to output the read data to the second FIFO memory. The track buffer memory includes a data area into which main data is written, an error information area into which error information for the main data is written and a microcomputer area into which a microcomputer of the optical disc reproduction apparatus writes data.

SUMMARY OF THE INVENTION

It is an object of the invention to create a method and an arrangement, which make it possible to use an SDRAM as storage for correction and track buffering in frontend ICs of optical recording or reproduction devices.

A frontend IC of an optical recording or reproduction device is designed to reconstruct the data from an optical disc and perform the error checks; in some embodiments a correction of the found errors and a storage of the data to compensate physical fluctuations of the reading unit are foreseen; this facility is called track buffer mode.

In accordance with an aspect of the invention the data to be stored or read are organized in appropriate bursts for accelerating the SDRAM traffic.

The SDRAM is built around two banks of memory, which are accessed by a particular pipelined address logic, and accelerates the speed compared to the common DRAM drastically. Most benefit of these features are achieved if the data transfer is done burstwise and if it is organized in the memory so that the access can be done in a so-called ping-pong mode, i.e. changing the bank at each access.

If the frontend IC is chosen with an external SDRAM an interface has to supervise the data transfer to and from that external SDRAM and to organize the external SDRAM. Therefore depending on the functional mode the tasks change:

A) The following four tasks must be handled in the track buffer mode:

A system decoder for high-speed data transmission with track buffer for an optical disc player has been disclosed by GB-A-2 321 334. Said system decoder includes a track buffer memory, a first FIFO memory for receiving data descrambled and error-detected and outputting the data by a unit of plural words, a second FIFO memory for receiving data from the track buffer memory and outputting the data by the unit of plural words, and a track buffer controller writing data in the first FIFO memory into the track buffer memory in a page mode, and reading the data written in the track buffer memory in a page mode to output the read data to the second FIFO memory. The track buffer memory includes a data area into which main data is written, an error information area into which error information for the main data is written and a microcomputer area into which a microcomputer of the optical disc reproduction apparatus writes data.

A1) Store the raw data coming from the Reed Solomon into the external SDRAM by help of the synchronization signals. While the REED-SOLOMON block performs the further following inner/outer corrections after the data was delivered by the REED-SOLOMON buffer the data of another ECC block is sent from the REED-SOLOMON buffer interface. Therefore the area must be as large as two ECC-blocks.

A2) When the Reed Solomon sends the data for correcting, the correction of the stored raw data has to be performed. Depending on how and when the Reed Solomon makes this data available the external SDRAM interface has to access randomly symbols from the ECC-block, to update it due to the correction data and to store it back.

A3) When the correction task of an ECC block is finished a track buffer control unit is informed and starts reading burst wise the corrected data. The symbols must be descrambled bitwise and the so-called EDC-check must be performed that concerns a final redunancy check for sectors of the datastream; after a fixed latency the descrambled data are written back via the external SDRAM address unit to the so called track buffer area in the SDRAM. This area is divided into sectors whose content that means the position and validity is controlled by the track buffer control unit.

A4) On request of the backend interface or the internal microcontroller the track buffer control unit requests sectors to read them from the track buffer area to the output buffer. To adapt the SDRAM speed to the speed of the backend a handshake procedure between the backend interface and the external SDRAM interface is foreseen. The control, which data are to be sent, is made by the track buffer control unit.

B) In a ramless REED-SOLOMON configuration the memory control can be used as a buffer for the raw data and the offset mask sent by the REED-SOLOMON before the backend interface can fetch them in an appropriate manner.

C) In the so called backward compatible configuration the SDRAM interface has to perform the tasks A1 and A2 before it sends the data to the part of the front end IC which performs the bitwise descrambling and EDC calculation according to the first part of task A3. The corrected and descrambled data are then sent back to the memory control which makes-them available for the backend interface adding the EDC-result at the end of each sector.

In case of the CD-modes the task A1 stores the incoming bitstream in the memory formed by said SDRAM. As the correction is done in the Reed Solomon block task A2 is not needed. The tasks A3 and A4 are performed as it is done in the DVD-mode where the trackbuffer control unit modifies the data according to the CD-necessities.

To perform all tasks the memory and timing control has to keep the buffers for adapting the different speeds of incoming and outgoing data streams and the control of the internal bus which in a REED-SOLOMON configuration using a RAM is connected to the SDRAM interface containing the address counters for the different tasks. In ramless REED-SOLOMON configuration the memory and timing control can organize in time and order the outgoing data streams to facilitate the task of the backend interface.

In the following sections the mode A is assumed; for the other configurations the data transfer is bypassed the obsolete blocks.

The arrangement according to the invention has the following blocks:

Reed Solomon Block

This block has to strip off the parity data from the data stream coming preferable from a buffer and sends it to the SDRAM address unit. After the correction data is calculated the update byte and the location of the correction must be sent to the SDRAM address unit, which has to perform the correction and store back the corrected symbol.

Track Buffer Control Unit

When the ECC-correction is performed the ECC block is must be moved from the so called ECC buffer area of the SDRAM to the so called track buffer area. The track buffer control unit gets a ready signal and a sector-wise read of the corrected data from the ECC buffer is started, the bits were descrambled, the ESD of the current sector calculated and the result stored back to the TR buffer area of the SDRAM following the symbolic location controlled by the track buffer control unit.

When the sector is finished the track buffer control unit decides if the current sector is valid and increments the location for the next sector or keeps it.

For the backend IC the track buffer control unit handles requests for sending sectors to it verifying that the requested sectors are contained in the trackbuffer area. If they are the request is forwarded to the SDRAM address unit, initializing the backend stream by sending the requested sector address. The backend interface informs the track buffer control unit of the end of the currently received sector.

In the ramless REED-SOLOMON functional configuration the raw data can be sent via the same lines while the correction mask, which is performed by offset and address, may be put to an additional line with a control signal to the backend interface when this data is available. The coordination and format of the stream of data and correction mask is an autonomous task of the backend interface unit.

SDRAM Address Unit

This unit has to answer for the requests previously described and has to make the bookkeeping of the memory resources. Depending on the SDRAM size and its timing specifications a proper mapping of the data to the physical SDRAM address must be made.

The SDRAM is functionally divided into two areas:

The ECC-block area and the

Track buffer area.

The ECC-block area must contain at least two ECC blocks because the calculation of the error correction can only be started after the ECC-block is completely read in from the REED SOLOMON part. The number of inner/outer-runs performed by the Reed Solomon unit determines the time when the correction data are available and can be sent to the-SDRAM address unit. If these processes are finished before the alternate ECC-block is read in only two ECC-blocks need to be stored in the SDRAM; otherwise the number must be increased.

The rest of the SDRAM can be filled by the track buffer area, which is organized in sectors. The track buffer control unit keeps a cross-reference between a long sector ID and the location in the track buffer area.

To accelerate the data exchange SDRAMs pipeline the addressing and the data traffic:

While the data are received or sent burst wise with a preset length the address for the start of the next burst package can be sent to the SDRAM depending on address and direction of the currently transferred data.

The incrementation of the address during burst operation is done internally by the SDRAM.

The addressing of SDRAMs is explained in more detail below what will clarify the need for this decoupling.

The usage of the SDRAM speeds up the SDRAM traffic of the DVD frontend IC allowing more sophisticated features in handling the data flow in the IC; the organization of the dataflow is easier to because bandwidth restrictions are avoided.

BRIEF DESCRIPTION OF THE DRAWINGS

The invention will now be described with reference to the accompanying drawings, in which.

DETAILED DESCRIPTION OF THE PREFERRED EMBODIMENTS

Figure 1:
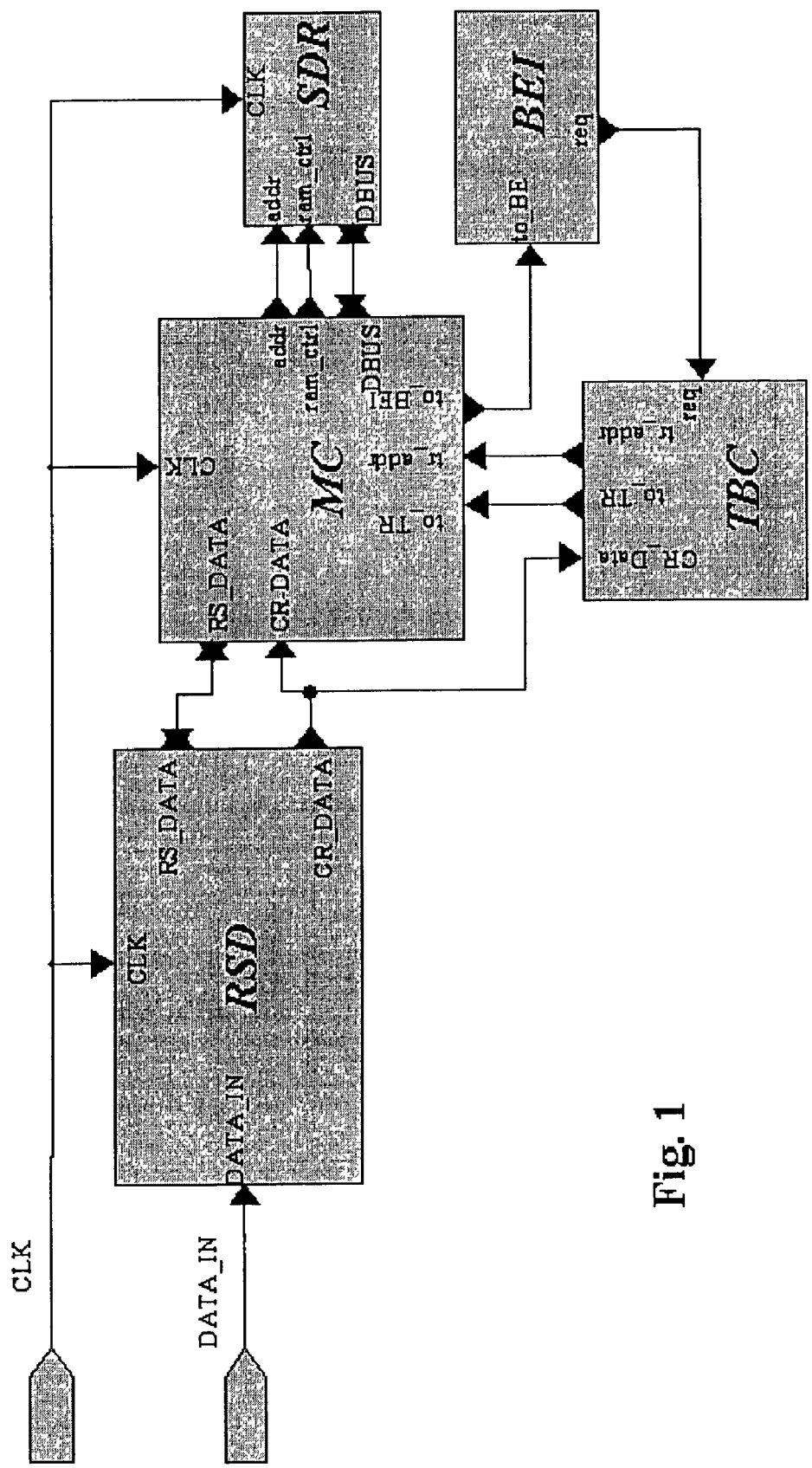
FIG. 1 is a block diagram for the usage of an SDRAM as storage for correction and track buffering in frontend ICs of optical recording or reproduction devices.

FIG. 1 illustrates the arrangement of an SDRAM SDR as storage for correction and track buffering in frontend ICs of optical recording or reproduction devices as for example a DVD-player. Blocks and connections as well as control lines for CD-modes are not included.

The DVD-player using an SDRAM SDR as storage for correction and track buffering in the frontend IC comprises according to FIG. 1 a Reed Solomon Decoder RSD, a memory controller MC, a track buffer controller TBC, a backend interface BEI and said SDRAM SDR. Reed Solomon Decoder RSD, memory controller MC and said SDRAM SDR are connected to a system clock CLK. The Reed Solomon Decoder RSD receives preprocessed data DATA_IN provided from an optical recording medium as for example a DVD. The preprocessed data DATA_IN are incoming symbols to the Reed Solomon Decoder RSD as well as not shown ECC-, sector- and frame-start signals from a not shown acquisition part. For the reason of simplification only summarized connections between the unites are shown in FIG. 1 which are mostly formed by several lines. The Reed Solomon Decoder RSD is connected with said memory controller MC to store and exchange correction data RS_DATA with memory controller MC and provides via a further connection corrected data CR_DATA for said memory controller MC and a track buffer controller TBC which provides via connections track information to_TR and track addresses tr_addr for the memory controller MC. Memory controller MC and SDRAM SDR are connected to exchange data via a bus DBUS controlled by addresses addr and RAM control signals ram_ctrl. And the mentioned backend interface BEI receives requested data to_BE from memory controller MC, which have been requested by request commands req, sent to the track buffer controller TBC.

The units shown in FIG. 1 are described in more detail below.

Reed Solomon Decoder RSD

This block strips off the parity data from incoming preprocessed data DATA_IN and sends it via a memory controller MC to the SDRAM SDR. After the correction data is calculated the faulty data on the SDRAM SDR is exchanged by the corrected data.

1.1 The track Buffer Controller TBC:

When the ECC-correction is performed the ECC block stored in the ECC area of the SDRAM SDR is ready for a transfer to the track buffer area. The track buffer controller TBC reads sector-wise the corrected data from the ECC area, prepares the validity decision and coordinates the storage of them via a memory control in the track buffer area of the SDRAM SDR.

On request of the track buffer controller TBC the memory controller MC fetches the data sectorwise from the track buffer area of the SDRAM SDR and delivers them to the backend interface BEI.

1.2 Memory Controller MC

This unit has to answer the requests previously described and makes the bookkeeping of the memory resources. Depending on the size of SDRAM SDR and its timing specifications a proper mapping of the data to the physical address is made.

The SDRAM SDR is functionally divided into two areas:
The ECC-block area and the
Track buffer area.

The ECC-block area must contain at least two ECC blocks because the calculation of the error correction can only be started after the ECC-block is completely read in from the Reed Solomon Decoder RSD. The number of inner/outer-runs performed by the Reed Solomon Decoder RSD determines the time when the corrected data CR_DATA is available and can be sent to the memory controller MC. If these processes are finished before the alternate ECC-block is read in only two ECC-blocks need to be stored in the SDRAM SDR; otherwise the number must be increased.

The track buffer area of the SDRAM SDR, which is organized in sectors, can fill the rest of the SDRAM SDR.

The memory controller MC has to keep the physical addresses of the related processes respecting the size and timing specification of the used SDRAM SDR. The data are sent burst wise with a preset burst length to SDRAM SDR and the address for the start of the next burst package is sent to the SDRAM SDR to accelerate the data exchange in the pipeline, the addressing and the data traffic. The SDRAM SDR does the incrementation of the address during burst operation internally.

Figure 2:
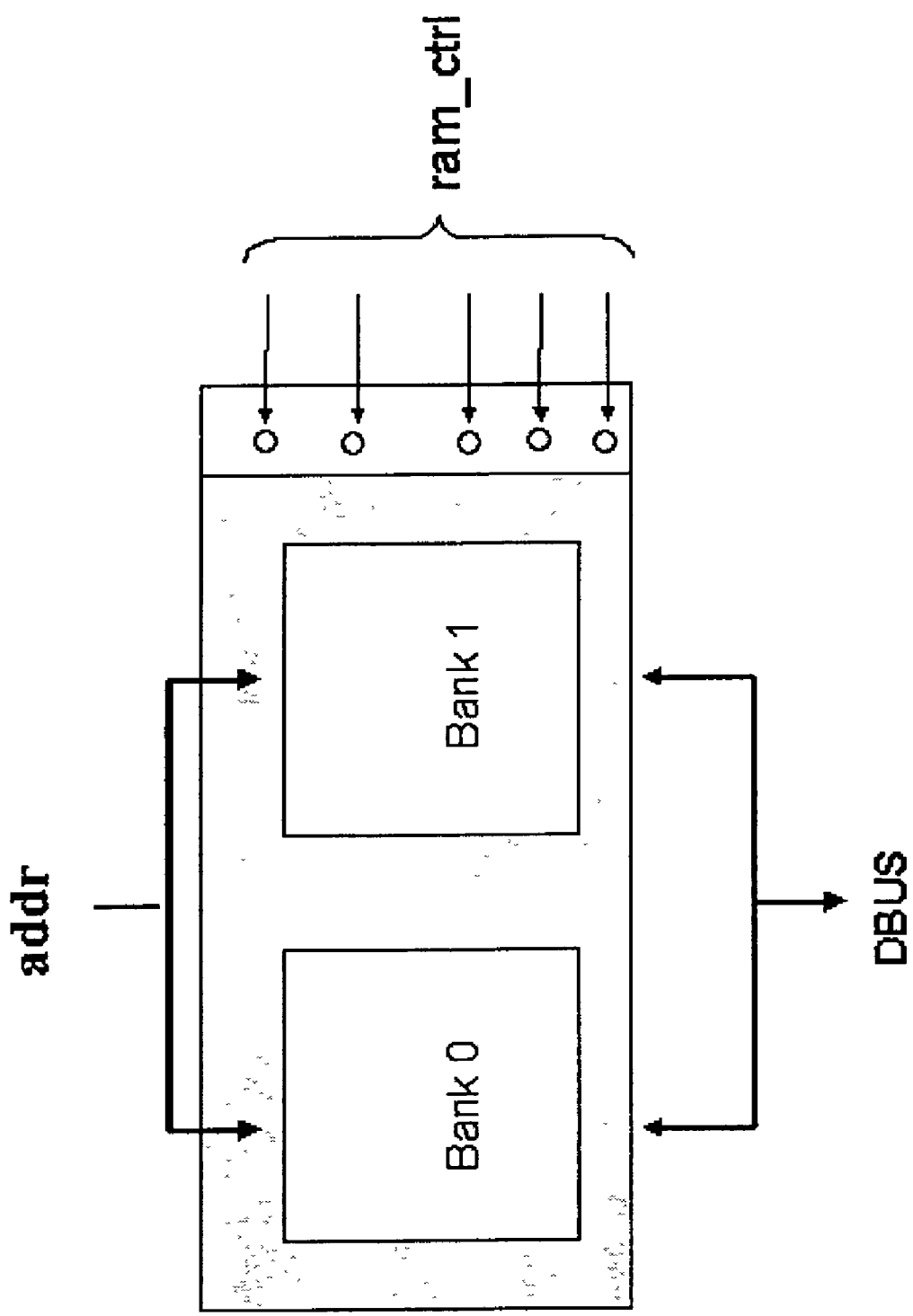
FIG. 2 is a schematic of the structure of a SDRAM.

The SDRAM SDR as shown in FIG. 2 is built around two banks Bank 0 and Bank1 of memory, which are accessed by particularly pipelined address and RAM control signals ram_ctrl. In contrast to normal DRAMS addressing can be widely done in parallel to the data operation which depends on the locations of the consecutive bursts. This accelerates the speed compared to the common DRAM drastically.

Most benefit of these features is achieved if the data transfer is done burstwise and if it is organized in the memory so hat the access can be done in ping-pong mode, i.e. changing the bank at each access.

The system clock CLK synchronizes all transfers although several different data speeds have to be handled.

Figure 3:
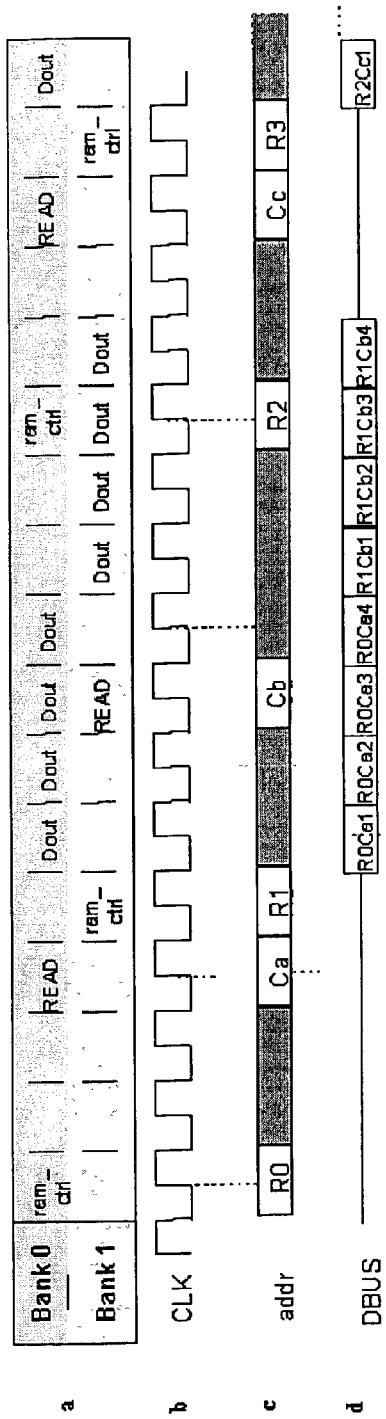
FIG. 3 is a schematic of a possible write sequence of the SDRAM and FIG. 4 is a schematic of a possible read sequence of the SDRAM.
Figure 4:
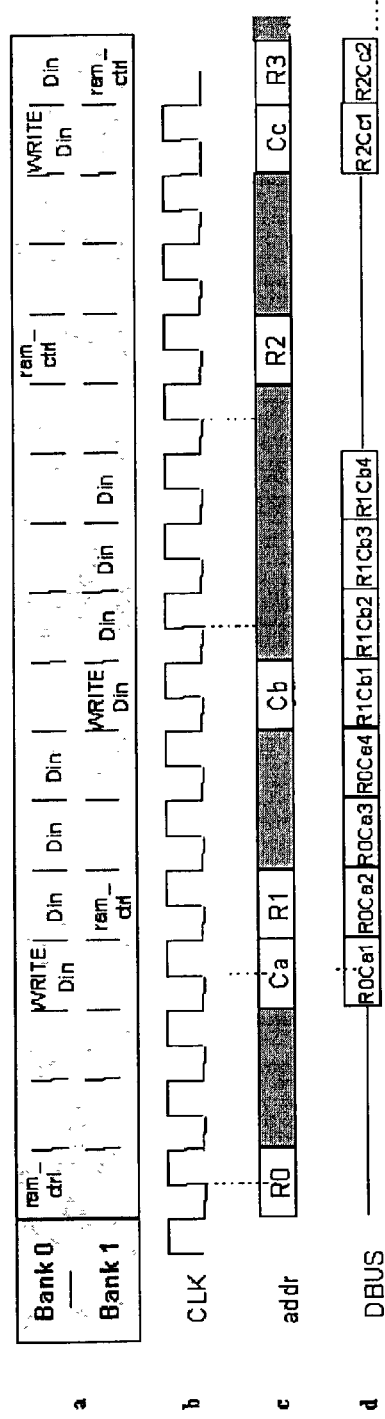

1.2.1 Operation of SDRAM SDR:

As an example two FIGS. 3 and 4 show the so called ping-pong operation as used for a SDRAM SDR with 16 Mbit Memory setting the so-called CAS-latency to a number of 2 for the used system clock CLK. The input-output operations of SDRAM SDR are performed as shown in FIGS. 3 and 4.

Each of the FIGS. 3 and 4 show a first row a illustrating the operations performed on bank Bank 0 and Bank1 of the memory of SDRAM SDR. Each transfer starts by activating the bank denoted by ram_ctrl followed by the read or write command performed by setting the ram_ctrl-signals of FIG. 1. The result of the operation is shown as DIN or DOUT denoting the direction of the data.

A second row b illustrates system clock CLK, a third row c shows specific addresses addr which are controlled by memory controller MC. They are split into row-address R0,R1 . . . and column-address Ca, Cb, . . . sent at the appropriate time.

A fourth row d illustrates data, which correspondingly occur on bus DBUS. The items are marked with the related locations R. and C. as sent on the address signals addr and an incremented number of the location in the burst.

The output operation as shown in FIG. 3 demonstrate successive read requests on mutual banks which have addresses and data active at the same time whereas FIG. 4 demonstrates the same for write operation.

The usage is not limited to the specific SDRAM as mentioned in the embodiment and a person skilled in the art can easily modify it without to leave the invention.

What is claimed is:

1. An optical recording or reproduction apparatus having a track buffer and a track buffer controller for high-speed data transmission characterised in that—a Synchronous Dynamic Random Access Memory (SDRAM)
is coupled to a memory controller (MC) which is furthermore connected with a Reed Solomon Decoder (RSD) and the track buffer controller (TBC) to form a front end IC of said optical recording or reproduction device and
is used as storage for correction and track buffering and data to be stored in said Synchronous Dynamic Random Access Memory (SDRAM) or to be read out from said Synchronous Dynamic Random Access Memory (SDRAM) is organized in bursts by the memory controller (MC) for accelerating the traffic of the Synchronous Dynamic Random Access Memory (SDRAM).

2. Apparatus according to claim 1 characterised in that the Synchronous Dynamic Random Access Memory (SDRAM) is coupled to a memory controller (MC) which forms an interface to supervise a data transfer to and from the Synchronous Dynamic Random Access Memory (SDRAM) and to organize the Synchronous Dynamic Random Access Memory (SDRAM) burstwise.

3. Apparatus according to claim 1 characterised in that the Synchronous Dynamic Random Access Memory (SDRAM) accesses randomly symbols from an ECC (Error Correction Code)-block to update it due to correction data (RS_DATA) and to store it back as corrected data (CR_DATA) in a track buffer area of the Synchronous Dynamic Random Access Memory (SDRAM).

4. Apparatus according to claim 1 characterised in that said from end IC performs bitwise descrambling and Error Detection Code (EDC) calculation of data.

5. An optical recording or reproduction apparatus having a track buffer and a track buffer controller for high-speed data transmission characterised in that
a Synchronous Dynamic Random Access Memory (SDRAM) is provided, which
is used as storage for correction and track buffering and data to be stored in said Synchronous Dynamic Random Access Memory (SDRAM) or to be read out from said Synchronous Dynamic Random Access Memory (SDRAM) is organized in bursts by a memory controller (MC) for accelerating the traffic of the Synchronous Dynamic Random Access Memory (SDRAM), which stores raw data coming from a Reed Solomon Decoder (RSD) into the Synchronous Dynamic Random Access Memory (SDRAM) by help of system clock CLK while the Reed Solomon Decoder (RSD) performs a second and further following inner/outer correction after the data was delivered by the Reed Solomon Decoder (RSD) and that depending on how and when the Reed Solomon Decoder (RSD) makes this data available the Synchronous Dynamic Random Access Memory (SDRAM) accesses random symbols from the ECC-block to update it due to the correction data (RS DATA) and to store it back as corrected data (CR_DATA) in a track buffer area of the Synchronous Dynamic Random Access Memory (SDRAM).

6. Apparatus according to claim 5 characterised in that the Synchronous Dynamic Random Access Memory (SDRAM) in a case of a CD reproduced by the optical recording or reproduction apparatus raw data coming from a Reed Solomon Decoder (RSD) are stored into the Synchronous Dynamic Random Access Memory (SDRAM) by help of a system clock (CLK) and are stored to Synchronous Dynamic Random Access Memory (SDRAM) under supervision of a track buffer controller (TBC) according to the CD necessities.

7. Apparatus according to claim 6 characterised in that raw data are stored from the Reed Solomon Decoder (RSD) via memory controller (MC) to perform the correction.

8. Apparatus according to claim 5 characterised in that the Synchronous Dynamic Random Access Memory (SDRAM) is used in a case of a DVD reproduced by the optical recording or reproduction apparatus raw data coming from a Reed Solomon Decoder (RSD) are stored into the Synchronous Dynamic Random Access Memory (SDRAM) by help of a system clock (CLK) while the Reed Solomon Decoder (RSD) performs inner/outer corrections in the Synchronous Dynamic Random Access Memory (SDRAM) after the data was delivered by the Reed Solomon Decoder (RSD), and the corrected data are modified and restored under supervision of a track buffer controller (TBC) according to the DVD necessities.

* * * * *